2,848,512
Patented Aug. 19, 1958

2,848,512

PREPARATION OF HYDRINDACENES

Louis Schmerling, Riverside, Ill., assignor to Universal Oil Products Company, Des Plaines, Ill., a corporation of Delaware No Drawing. Application October 10, 1955
Serial No. 539,647

20 Claims. (Cl. 260—668)

This invention relates to a process for preparing novel compositions of matter and particularly to a method for preparing alkyl substituted polynuclear hydrocarbons. More particularly the invention relates to a method of preparing alkyl substituted hydrindacenes.

It is an object of this invention to provide a method for preparing novel compositions of matter comprising substituted hydrindacenes.

A further object of this invention is to provide a method for preparing novel compositions of matter comprising substituted hydrindacenes, said process being carried out in the presence of a protonic acid catalyst.

One embodiment of this invention resides in a process for the preparation of a substituted polynuclear hydrocarbon by treating an aromatic hydrocarbon containing at least two pairs of unsubstituted adjacent carbon atoms separated by at least one carton atom with a conjugated diene in the presence of a protonic acid catalyst, and recovering the resultant polynuclear hydrocarbon.

A further embodiment of the invention is found in a process for preparing a substituted polynuclear hydrocarbon by treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of a protonic acid catalyst, and recovering the resultant polynuclear hydrocarbon.

A specific embodiment of the invention is found in a process for the preparation of 1,1,5,5-tetramethylhydrindacene which comprises treating benzene with isoprene in the presence of a catalyst consisting of concentrated sulfuric acid at a temperature in the range of from about 0° to about +35° C., and recovering the resultant 1,1,5,5-tetramethylhydrindacene.

A more specific embodiment of the invention resides in a process for preparing 1,1,5,5-tetramethylhydrindacene by treating benzene with isoprene in the presence of a solvent consisting of methylcyclohexane and a catalyst consisting of concentrated sulfuric acid at a temperature in the range of from about 0° to about +35° C., and recovering the resultant 1,1,5,5-tetramethylhydrindacene.

Yet another specific embodiment of the invention resides in a new composition of matter consisting of 1,1,5,5-tetramethylhydrindacene.

Other objects and embodiments referring to alternative aromatic hydrocarbons and to alternative conjugated dienes in which one of the doubly bonded carbon atoms is a tertiary carbon atom will be found in the following further detailed description of the invention.

It has now been discovered that substituted polynuclear hydrocarbons such as alkyl substituted hydrindacenes may be prepared by treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of a protonic acid catalyst. The products thus prepared are useful as intermediates for the preparation of other organic compounds such as pharmaceuticals, oxidation inhibitors, detergents, etc. For example, when an aromatic hydrocarbon such as benzene is treated with a conjugated diene such as isoprene in the presence of a protonic acid catalyst, a substituted hydrindacene consisting of 1,1,5,5-tetramethylhydrindacene is formed. This compound may then be converted to 4-hydroxy-1,1,5,5-tetramethylhydrindacene and 4,8-dihydroxy-1,1,5,5-tetramethylhydrindacene by hydrolysis of the sulfonic acid formed by its sulfonation or by reaction of the diazonium compound formed from the amines obtained by the reduction of the nitro derivatives, which in turn were formed by nitration of the substituted hydrindacene. The 4-hydroxy- and 4,8-dihydroxy-1,1,5,5-tetramethylhydrindacenes which are thus obtained show marked activity as oxidation inhibitors.

Aromatic hydrocarbons which may be used in this invention are those which contain at least two pairs of unsubstituted adjacent carbon atoms separated by at least one carbon atom. These include benzene, toluene, ethylbenzene, propylbenzene, butylbenzene, etc., p-xylene, p-diethylbenzene, p-dipropylbenzene, etc., naphthalene, α-methylnaphthalene, β-methylnaphthalene, α-ethylnaphthalene, β-ethylnaphthalene, α-propylnaphthalene, β-propylnaphthalene, etc., anthracene, α-methylanthracene, β-methylanthracene, γ-methylanthracene, α-ethylanthracene, β-ethylanthracene, γ-ethylanthracene, etc., phenanthrene, 1-methylphenanthrene, 2-methylphenanthrene, 3-methylphenanthrene, 1-ethylphenanthrene, 2-ethylphenanthrene, 3-ethylphenanthrene, etc., chrysene, 1-methylchrysene, 2-methylchrysene, 3-methylchrysene, 1-ethylchrysene, 2-ethylchrysene, 3-ethylchrysene, etc., pyrene, 1-methylpyrene, 2-methylpyrene, 3-methylpyrene, 2,7-dimethylpyrene, 2,7-diethylpyrene, etc. Naphthalene and the other polynuclear hydrocarbons yield reaction products which are analogs of hydrindacene.

Conjugated dienes, in which at least one of the doubly bonded carbon atoms is a tertiary carbon atom, which are used to treat the aromatic hydrocarbons to form the substituted hydrindacenes include 2-methylbutadiene-1,3 (isoprene), 2,3-diethylbutadiene-1,3, 2,3-diethylbutadiene-1,3, 2-methylphentadiene-1,3, 3-methylpentadiene-1,3, 2-ethylpentadiene-1,3, 3-ethylpentadiene-1,3, 2,3-dimethylpentadiene-1,3, 2,4-dimethylpentadiene-1,3, 2,3-diethylpentadiene-1,3, 2,4-diethylpentadiene-1,3, 2-methylhexadiene-1,3, 2-ethylhexadiene-1,3, 2,3-dimethylhexadiene-1,3, 2,4-dimethylhexadiene-1,3, 2,5-dimethylhexadiene-1,3, 2,3-diethylhexadiene-1,3, 2,4-diethylhexadiene-1,3, 2,5-diethylhexadiene-1,3, 2,5-diethylhexadiene-1,3, 2-mthylhexadiene-2,4, 2-ethylhexadiene-2,4, 2,3-dimethylhexadiene-2,4, 2,4-dimethylhexadiene-2,4, 2,5-dimethylhexadiene-2,4, 2,3-diethylhexadiene-2,4, 2,4-diethylhexadiene-2,4, 2,5-diethylhexadiene-2,4, etc.

The process of this invention is carried out in the presence of a protonic acid alkylation catalyst. Examples of protonic acids include concentrated sulfuric acid, hydrogen fluoride, phosphoric acid, silica-alumina composites, etc. In addition, if so desired, the reaction may be carried out in the presence of a saturated hydrocarbon. These saturated hydrocarbons include paraffins and cycloparaffins containing a tertiary carbon atom as well as compounds which may be isomerized to such tertiary carbon atom containing hydrocarbons under the conditions of the reaction. Examples of these hydrocarbons include n-pentane, isopentane, n-hexane, isohexane, etc., cyclohexane, methylcyclopentane, ethylcyclopentane, propylcyclopentane, methylcyclohexane, ethylcyclohexane, 1,2-dimethylcyclopentane, 1,2-ethylcyclopentane, 1,2-methylcyclohexane, 1,2-diethylcyclohexane, 1,4-dimethylcyclohexane, 1,4-diethylcyclohexane, etc. The process of this invention may be carried out at relatively low temperatures, said temperatures, being in the range of from about 0° to about +35° C. when sulfuric acid or hydrogen fluoride is used as a catalyst, and from about 25° to about 200° C. when phosphoric acid is used as a catalyst. Even higher temperatures may be used with weakly acidic catalysts such as the silica-alumina composites.

The process of this invention may be effected in any suitable manner and may comprise either a batch or continuous type operation. When a batch type operation is used, a quantity of the starting materials, namely the aromatic hydrocarbons and the conjugated dienes, in which at least one of the doubly bonded carbon atoms is a tertiary carbon atom, are added to a stirred mixture of the aromatic hydrocarbon, and, if so desired, the saturated hydrocarbon, and the catalyst in a suitable alkylating vessel. The vessel is maintained at the desired low temperature, which may be below normal room temperature, when sulfuric acid or hydrogen fluoride is used as a catalyst, until the addition of the reactants is completed, after which the temperature is allowed to rise to the upper limits hereinbefore stated, meanwhile continuously agitating the reaction mixture. After a predetermined residence time has elapsed, the reaction product is separated from the unreacted starting materials by conventional means, for example, by washing, drying and fractional distillation, either at atmospheric or under reduced pressure. Purification of the reaction products may then be effected by redistillation or by recrystallization from organic solvents such as alcohols, ethers, etc.

Another method of operation of the present process is of the continuous type. In this process the starting materials are continuously introduced into a reaction zone which is maintained at the proper operating conditions of temperature and pressure. The reaction zone may comprise an unlined vessel or coil, or may contain an adsorbent packing material such as fire brick, alumina, dehydrated bauxite, and the like. The starting materials can be continuously introduced into the vessel by separate means or may be previously admixed outside the vessel and the resulting mixture introduced into the vessel in a single stream. The catalyst, comprising a protonic acid, is also introduced into said reactor through separate means, as is the organic solvent or diluent comprising a saturated hydrocarbon. At the end of the desired residence time the reaction product will be continuously withdrawn from the reaction zone and separated from the catalyst, saturated hydrocarbons, unreacted aromatic hydrocarbons and conjugated dienes, the latter two being recycled for use as a portion of the starting materials, while the reaction product consisting of substituted hydrindacenes are withdrawn and purified by the conventional means hereinbefore set forth.

Examples of compounds which may be prepared according to this reaction, and which comprise new compositions of matter include 1,1,5,5-tetramethylhydrindacene, 1,1,5,5-tetraethylhydrindacene, 1,1,5,5-tetrapropylhydrindacene, 1,1,4,5,5-pentamethylhydrindacene, 1,1,5,5-tetramethyl-4-ethylhydrindacene, 1,1,5,5-tetramethyl-4,8-diethylhydrindacene, 1,1,4,5,5,8-hexamethylhydrindacene, 1,1,3,3,5,5,7,7-octamethylhydrindacene, etc.

The following example is given to illustrate the process of the present invention which, however, is not intended to limit the generally broad scope of the present invention in strict accordance therewith.

*Example I*

A solution of 34 g. (0.50 mole) of isoprene in 80 g. of benzene was gradually added to a stirred mixture of a solution of 200 g. of methylcyclohexane in 160 g. of benzene and 100 g. of 96% sulfuric acid in an alkylating flask. The temperature of the flask was maintained at a temperature of from about 3° to about 5° C. during the addition of the isoprene to the benzene, said addition taking approximately 1.8 hours. At the end of this time the upper layer totalling 550 g. was separated from the lower catalyst layer (110 g.), washed with water, dried and subjected to fractional distillation under reduced pressure. After removal of unreacted benzene and methylcyclohexane, there was obtained a cut boiling at 90° C. at 50 mm. pressure. The material crystallized upon standing. It was recrystallized from the dilute ethyl alcohol, yielding nacreous flakes having a melting point of 91–93° C. and consisting of 1,1,5,5-tetramethylhydrindacene.

As a by-produce of this reaction there was obtained a small amount of 1,1-dimethylindan boiling at 78° C. at 18 mm. pressure.

I claim as my invention:

1. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the double bonded carbon atoms is a tertiary carbon atom, in the presence of a protonic acid catalyst selected from the group consisting of sulfuric acid, hydrogen fluoride, phosphoric acid and silica-alumina, and recovering the resultant polynuclear hydrocarbon.

2. The process of claim 1 further characterized in that said conjugated diene contains from 5 to 8 carbon atoms per molecule.

3. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of sulfuric acid, and recovering the resultant polynuclear hydrocarbon.

4. The process of claim 3 further characterized in that said conjugated diene contains from 5 to 8 carbon atoms per molecule.

5. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of hydrogen fluoride, and recovering the resultant polynuclear hydrocarbon.

6. The process of claim 5 further characterized in that said conjugated diene contains from 5 to 8 carbon atoms per molecule.

7. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of phosphoric acid, and recovering the resultant polynuclear hydrocarbon.

8. The process of claim 7 further characterized in that said conjugated diene contains from 5 to 8 carbon atoms per molecule.

9. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of a protonic acid catalyst selected from the group consisting of sulfuric acid, hydrogen fluoride, phosphoric acid and silica-alumina at a temperature in the range of from about 0° to about 200° C., and recovering the resultant polynuclear hydrocarbon.

10. A process for the preparation of a substituted polynuclear hydrocarbon which comprises treating an aromatic hydrocarbon containing at least two pairs of unsubstituted adjacent carbon atoms separated by at least one carbon atom with isoprene in the presence of a catalyst consisting of concentrated sulfuric acid at a temperature in the range of from about 0° to about +35° C., and recovering the resultant substituted polynuclear hydrocarbon.

11. A process for the preparation of 1,1,5,5-tetramethylhydrindacene which comprises treating benzene with isoprene in the presence of a catalyst consisting of concentrated sulfuric acid at a temperature in the range of from about 0° to about +35° C., and recovering the resultant 1,1,5,5-tetramethylhydrindacene.

12. A process for the preparation of 1,1,4,5,5-pentamethylhydrindacene which comprises treating toluene with isoprene in the presence of a catalyst consisting of concentrated sulfuric acid at a temperature in the range of from about 0° to about +35° C., and recovering the resultant 1,1,4,5,5-pentamethylhydrindacene.

13. A process for the preparation of 1,1,4,5,5,8-hexamethylhydrindacene which comprises treating p-xylene with isoprene in the presence of a catalyst consisting of concentrated sulfuric acid at a temperature in the range of from about 0° to about +35° C., and recovering the resultant 1,1,4,5,5,8-hexamethylhydrindacene.

14. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of a hydrocarbon solvent and a protonic acid catalyst selected from the group consisting of sulfuric acid, hydrogen fluoride, phosphoric acid and silica-alumina, and recovering the resultant substituted polynuclear hydrocarbon.

15. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of a solvent consisting of a paraffin and a catalyst consisting of concentrated sulfuric acid, and recovering the resultant polynuclear hydrocarbon.

16. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of a solvent consisting of a cycloparaffin and a catalyst consisting of concentrated sulfuric acid at a temperature in the range of from about 0° to about +35° C., and recovering the resultant polynuclear.

17. A process for the preparation of a substituted polynuclear hydrocarbon which comprises treating an aromatic hydrocarbon containing at least two pairs of unsubstituted adjacent carbon atoms separated by at least one carbon atom with a conjugated diene, in which at least one of the doubly bonded carbon atoms is a tertiary carbon atom, in the presence of a solvent consisting of methylcyclohexane and a catalyst consisting of concentrated sulfuric acid at a temperature in the range of from about 0° to about +35° C., and recovering the resultant substituted polynuclear hydrocarbon.

18. A process for the preparation of 1,1,5,5-tetramethylhydrindacene which comprises treating benzene with isoprene in the presence of a solvent consisting of methylcyclohexane and a catalyst consisting of concentrated sulfuric acid at a temperature in the range of from about 0° to about +35° C., and recovering the resultant 1,1,5,5-tetramethylhydrindacene.

19. A process for the preparation of 1,1,4,5,5-pentamethylhydrindacene which comprises treating toluene with isoprene in the presence of a solvent consisting of methylcyclopentane and a catalyst consisting of concentrated sulfuric acid at a temperature in the range of from about 0° to about +35° C., and recovering the resultant 1,1,4,5,5-pentamethylhydrindacene.

20. A process for the preparation of 1,1,3,3,5,5,7,7-octamethylhydrindacene which comprises treating benzene with 2,4-dimethyl-2,4-pentadiene in the presence of a solvent consisting of methylcyclohexane and a catalyst consisting of concentrated sulfuric acid at a temperature in the range of from about 0° to about +35° C., and recovering the resultant 1,1,3,3,5,5,7,7-octamethylhydrindacene.

References Cited in the file of this patent

UNITED STATES PATENTS

| | | |
|---|---|---|
| 2,338,742 | Soday | Jan. 11, 1944 |
| 2,752,403 | Schultze et al. | June 26, 1956 |
| 2,768,982 | Schlatter | Oct. 30, 1956 |

FOREIGN PATENTS

| | | |
|---|---|---|
| 687,521 | Great Britain | Feb. 18, 1953 |

OTHER REFERENCES

Ipatieff et al.: "Journal of the Am. Chem. Soc.," vol. 66, pages 816–17 (1944).